June 3, 1969     J. GOEDKOOP     3,447,664

SYSTEM OF TWO VERTICAL COLUMNS OF MOVABLE SUPPORT UNITS

Filed May 5, 1967

INVENTOR.
JOHAN GOEDKOOP

BY

ATTORNEY

United States Patent Office 3,447,664
Patented June 3, 1969

3,447,664
SYSTEM OF TWO VERTICAL COLUMNS OF MOVABLE SUPPORT UNITS
Johan Goedkoop, Sloatsburg, N.Y. (% Netherlands Industrial Trading Corp., 17 Battery Place, New York, N.Y. 10004)
Continuation-in-part of application Ser. No. 515,351, Dec. 21, 1965. This application May 5, 1967, Ser. No. 636,497
Int. Cl. B65g 37/00; E04h 6/00
U.S. Cl. 198—85                                    20 Claims

ABSTRACT OF THE DISCLOSURE

A system of two vertical columns of movable support units includes a lower support means comprising a rotating motor and two pairs of rotating plates which supports the two columns and moves a lowermost movable support unit from one column to the other. An upper support means comprising two pairs of rotating plates is supported by the uppermost nested immovable support unit in each of the two columns, not by any outer framework, and moves an uppermost not-nested movable support unit from one column to the other.

---

This is a continuation-in-part of my abandoned application SN 515,351 filed Dec. 21, 1965.

This invention relates to materials handling systems, and particularly to a system which translates a plurality of horizontal material supporting surfaces along a vertical axis.

Such a system may be embodied as an automobile parking apparatus, wherein a plurality of automobile supporting cradles are translated up and down to respectively receive, store and discharge automobiles. In certain known apparatus the cradles are supported either directly from two endless chains, or by arms, which arms are supported by the chains. In each case the chains extend between upper and lower axles, with the upper axle or axles and the companion sprocket wheels supporting the entire load of chains, cradles and automobiles. This requires the upper axle or axles and its sprocket wheels to be relatively massive, and requires an elaborate structure to support this upper axle or axles. Further, the chains being under continuous tension tend to stretch, and any increase in the length of the chains must be accommodated, as by elevating the upper axle, or in some other way. Should it be desired to increase or decrease the capacity of the apparatus, major reconstruction of the apparatus is required. Yet further, a relatively large spacing is required between the two columns of cradles respectively attached to the two chains. On the other hand, it is desirable to have the lateral spacing between adjacent columns of cradles as small as possible to minimize the horizontal area of the structure, and adequate vertical spacing to avoid interengagement must be provided between adjacent cradles as each cradle is shifted from one column to the other column either at the top or bottom of the chains. If the cradles are supported by the chains or by arms carried by the chains with minimal spacing between cradles of the same chain, there is not adequate space below uniformly spaced adjacent cradles in elevated position for the passage of an automobile.

One object of the invention is to provide a materials handling system which is free of the above mentioned disadvantages.

It is also an object of this invention to provide a materials handling system which translates a plurality of horizontal material supporting surfaces along a vertical axis and which does not require chains, cables or the like to support and translate said surfaces.

It is another object of this invention to provide such a system wherein the surfaces are formed in cradles, and the intermediate cradles support and elevate the upper cradles; wherein the intermediate cradles are nested in two columns; and with minimal space between the two columns.

A further object is to provide a materials handling system which may be disposed within a multi-story building and which enables access to be had readily from each of a plurality of floors of the building to the cradles of the columns, access to the cradles being unobstructed by the cradle supports, and without vertical spacing between adjacent cradles of the same column.

A feature of this invention is the provision of a plurality of movable support units, each having a material support surface, such as a cradle; a lower support means for supporting two vertical columns of support units and for sequentially translating support units from one of said columns to the other of said columns; and an upper support means supported by the intermediate portions of said columns, for sequentially translating support units from the other of said columns to the one of said columns.

These and other objects, features and advantages of this invention will become apparent upon consideration of the following detailed description of a preferred embodiment taken in conjunction with the drawing in which:

As seen in the drawing embodied as system adapted for the receipt, storage and discharge of automobiles, the system 10 comprises a plurality of cradles 12 arranged in two columns, the columns being supported by a lower support means 14, which also sequentially translates the cradles from the bottom of one column, to and/or through a lowermost, central, receive-discharge position, to the other column. An upper support means 16 is disposed at the upper portions of the two columns, is supported by the intermediate portions of the two columns, and sequentially translates the cradles from the top of one column, to and/or through an uppermost, central position to the other column. By this arrangement the motive means is disposed at the bottom of the system, adjacent the ground, and pushes the cradles upwardly.

The lower support means 14 includes a pair of front and rear spaced apart A frames, each frame including two upper diagonal members 18, two lower vertical members 20, a horizontal member 22. A pair of front and rear sets of bearings 24 are respectively supported at the apexes of the A frames, and two shafts 26 are respectively supported in and between these bearings. Each A frame also has an upper horizontal member 28, an intermediate horizontal member 30, and a vertical member 32 which is fixed between the apex and the intermediate member 30. A transverse shaft 34 is journaled in suitable bearings to and between the front and rear members 32, and has fixed thereto a front worm gear 36 and a pair of front and rear spaced apart spur gears 38. A motor 40 is disposed on the front intermediate horizontal member 28 and has a worm 42 meshed with the worm gear 36. The shafts 26 have each respectively fixed thereto a pair of front and rear spaced apart spur gears 44, and a pair of front and rear spaced apart sets of spur gears 46. The spur gears 38 mesh with and drive the spur gears 44 respectively.

A pair of front and rear spaced apart sets of four flanged rollers 48 are also respectively mounted to the A frames by front and rear upper brackets 50 and lower brackets 52. A pair of front and rear outer rotating plates 54, each having a central circular aperture 56, are fitted onto the respective sets of four, double flanged, rollers 48, with the periphery of the aperture 56 riding on these rollers, between their flanges. A plurality of teeth 58, disposed in a ring, are integral with each outer plate 54, projecting transversely from the inward facing surface thereof, and are meshed with the respective gears 44, whereby the pair of gears 44 is adapted to drive the pair of outer plates 54, which are each guided for rotation by a set of four rollers 48.

A pair of front and rear spaced apart sets of four, double flanged, rollers 60 are mounted to the A frame coaxially with the rollers 48. A pair of front and rear inner rotating plates 62, each having a central circular aperature 64, are fitted onto the respective sets of four, double flanged rollers 60, the periphery of the aperture 64 riding on these rollers between their flanges. A plurality of teeth 66, disposed in two rings, are integral with each inner plate 62, projecting transversely from the inward facing and outward facing surfaces thereof, and are respectively meshed with the two gears of each set of gears 46, whereby the pair of sets of gears 46 are adapted to drive the pair of inner plates 62 which are each guided for rotation by a set of four rollers 60.

Each of the cradles 12 comprises two front and rear transversely spaced apart end members 70 of substantial rectangular outline, having straight, vertical side portions 72 and 72' and horizontal bottom and top portions 74 and 74' respectively, which are each straight except for a central portion which includes a reflex, trapezoidally shaped bend 76 and 76' respectively. The cradles are adapted to nest with their trapezoidal bends interengaged. The bottom portions of the two end members are connected by a material supporting surface 78 having two lower level portions 80, to receive the wheels of an automobile, and a medial, upper level portion 81, inner alia, to catch any oil drippings from the automobile. A shaft 82 is journaled through and between the upper portions of the two front and rear end members and has a pair of front and rear sets of rollers 84 and 86 journaled at each end. The inner, greater load bearing roller 84 may advantageously have a larger diameter than the outer, lower load bearing roller 86.

A platform 90 is disposed between the front and rear A frames, slightly spaced above the level of the ground, and pivotally supported by two front and rear sets of links 92. These links are respectively pivotally mounted to the A frame at the junctions 94 of the horizontal members 22 with the lower vertical members 20, and are respectively pivotally mounted to the front and rear ends of the platform at points 96. This platform is adapted to receive the bottom portions 74 of the end members 70 of the lowermost cradle 12 as it enters, remains in, and departs from the automobile receive-discharge position shown in FIG. 4. The radius of swing of the platform is identical to the radius of swing of the bottom of the cradle.

The front and rear inner plates 62 each comprise a four lobe cam. Each lobe of this cam has two arcuate throats or tracks 98 having a common mouth 100. These mouths 100 are adapted to receive the rollers 84 and the throats 98 are adapted to capture and to support these rollers 84 and the cradles 12 attached thereto. At any given time, at least two cradles 12, one in each column, will be supported by and between the front and rear inner plates 62. All of the cradles nesting on top of these two cradles will thus be supported by these inner plates 62.

The front and rear outer plates 54 each comprise a two lobe cam. Each lobe of the cam has a Y shaped cam surface having a throat 102 and two mouths 104. The cam surfaces are formed on an interiorly projecting portion 106 of the cam and includes a recess or groove 108. These mouths 104 are adapted to receive the rollers 86 and the throats 102 are adapted to support these rollers while the grooves 108 receive and transversely capture the flanges 88. Intermittently, one of the cradles 12, which is the lowermost cradle, will be supported by and between the front and rear outer plates 54.

Figure 4:
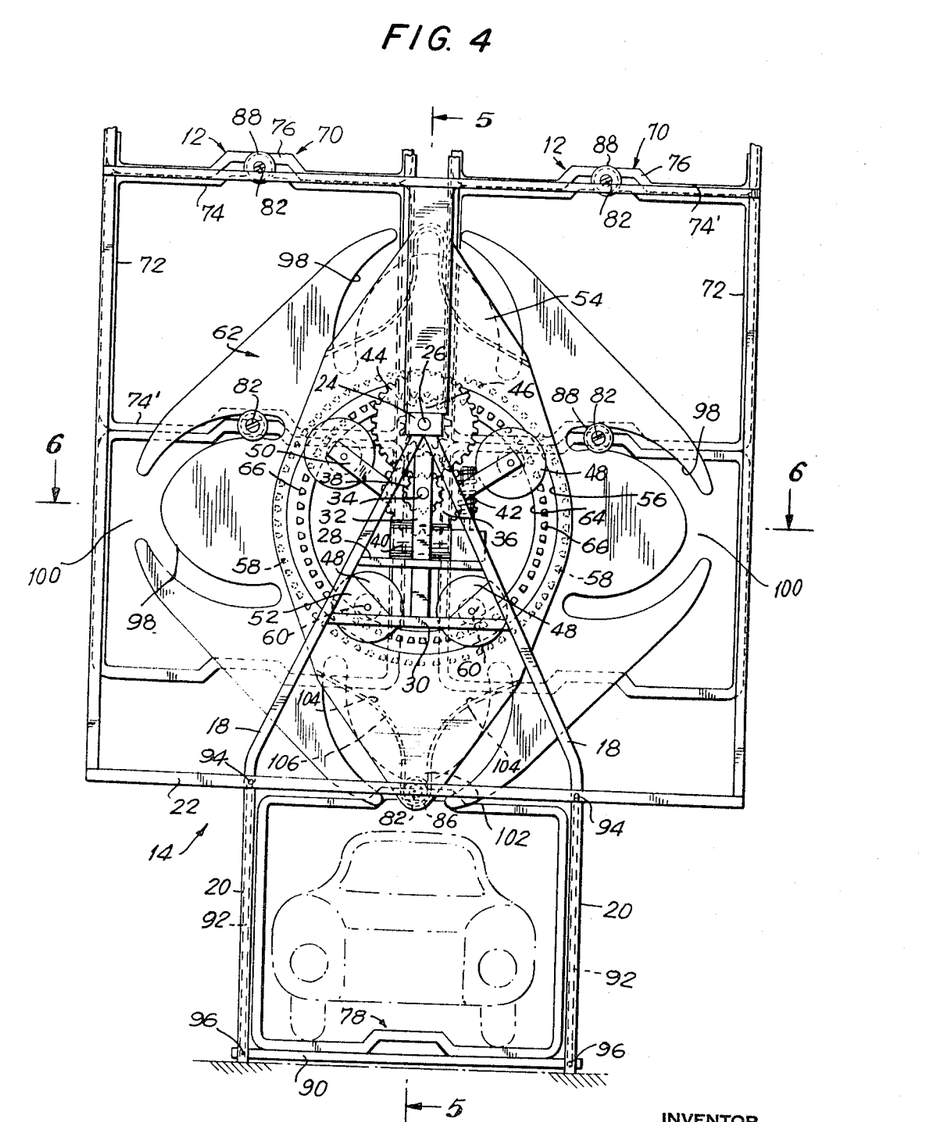
FIG. 4 is an enlarged detail front view of the lower portion of the system of FIG. 1, showing the lower means for supporting and translating the cradles and showing a lowermost cradle in the automobile central receive-discharge position.
Figure 5:
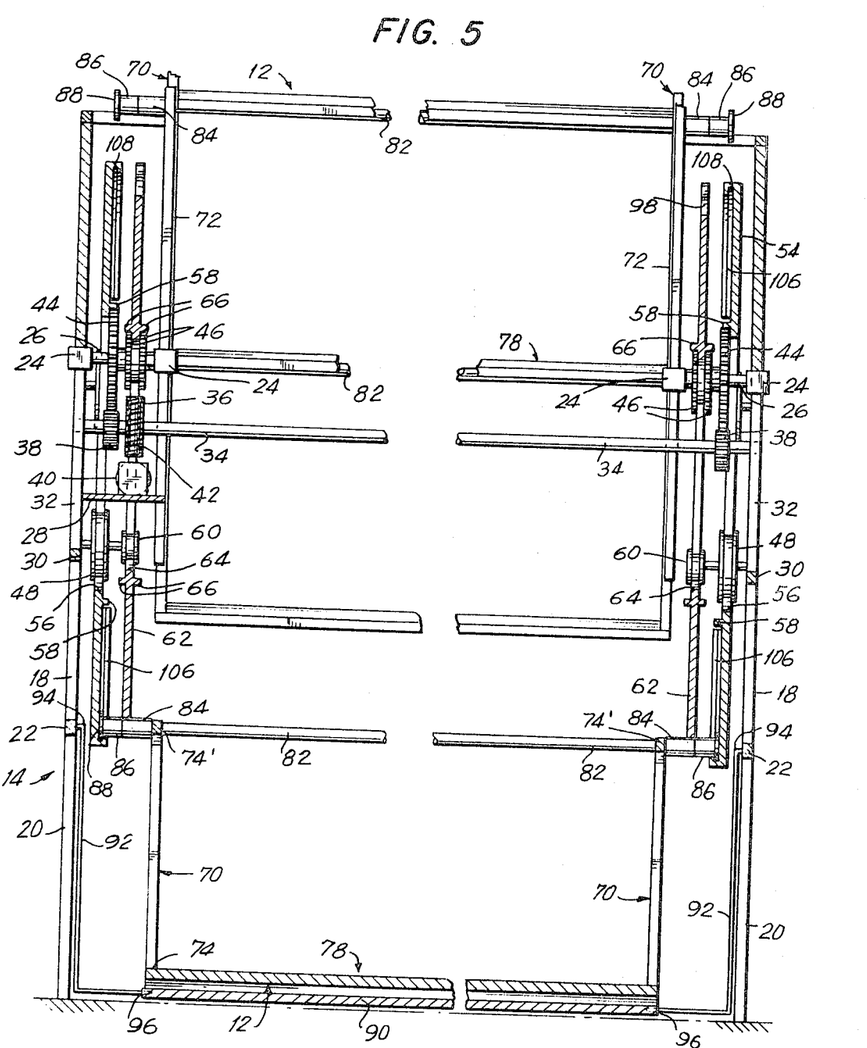
FIG. 5 is a side view in cross-section taken along the plane 5—5 of FIG. 4.
Figure 6:
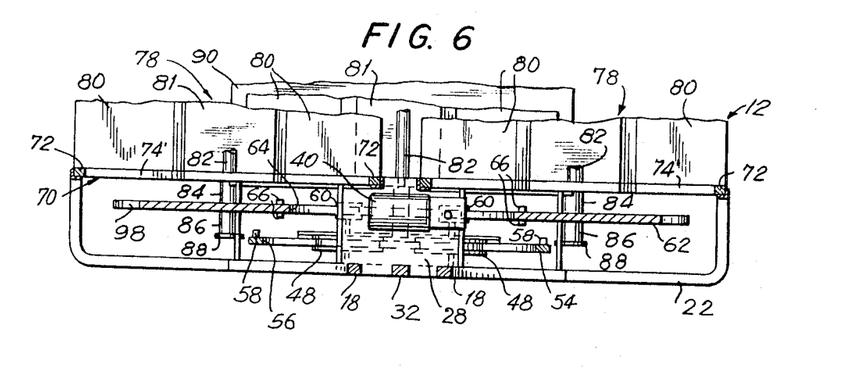
FIG. 6 is a top view in cross-section taken along the plane 6—6 of FIG. 4.
Figure 7:
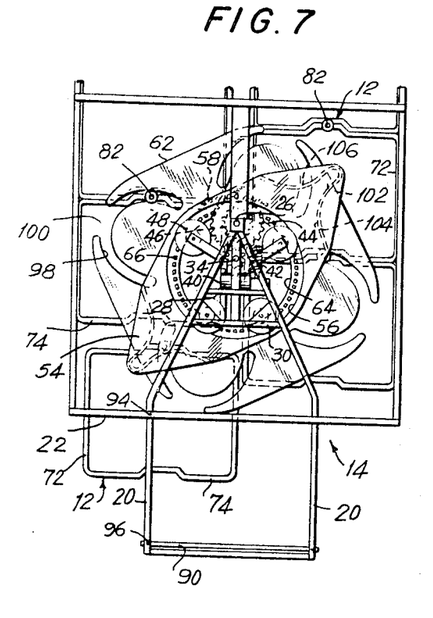
FIG. 7 is a detail similar to FIG. 4 showing the lowermost cradle being removed from the receive-discharge position.
Figure 8:
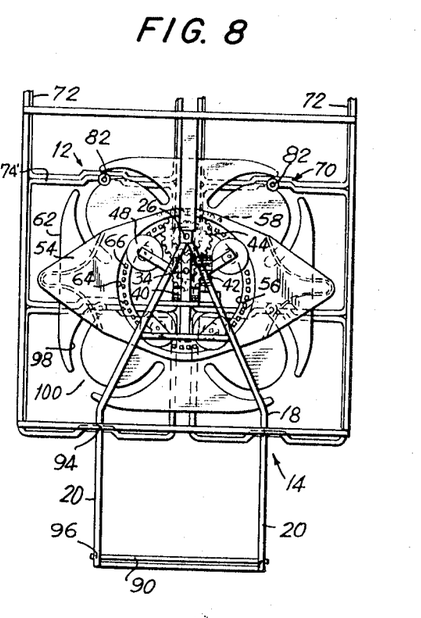
FIG. 8 is a detail similar to FIG. 7 showing the lowermost cradle completely removed from the receive-discharge position, and the columns in the storage array.

As seen in FIG. 4 the lowermost cradle 12 is in the automobile receive-discharge position, wherein it is disposed on the pivotally supported platform 90, is also disposed between the lower vertical members 20 of the A frame and is supported by its rollers 86 being disposed in the bottom of the throats 102 of the outer plates 54. The two columns of cradles are level and the lowest cradle in each column is supported by its rollers 84 being disposed in the upper throats 98 of the inner plates 62. The tooth ratios of the teeth 58 of the outer plates 54 and their drive gears 44 and the teeth 66 of the inner plate 62 and their drive gears 46 are arranged such that the outer plate rotates twice as fast as the inner plate. Thus, as the motor 40 rotates the inner and outer pairs of plates clockwise, the outer plates swing the lowermost cradle 12 clockwise upwardly towards the bottom of the left column of cradles. The cam mouth 104 is designed so that this lowermost cradle accelerates slowly as it leaves the bottom of the descending column, and decelerates slowly as it approaches the bottom of the ascending column. Meanwhile, as seen in FIG. 7, the inner plates shift the left column of cradles upwardly and the right downwardly. Finally, as sene in FIG. 8, the formerly lowermost cradle has become the lowest cradle in the left column and is at the same level as the lowest cradle in the right column. Both columns are now lower by about one half the height of a cradle than they were when a cradle was in the receive-discharge position, which is substantially level with the horizontal member 22 of the A frame, which is about the height of a cradle off the ground. Thus, with the system halted at this position of the cradle, as shown in FIG. 8, an automobile may be driven between the legs of the front and rear A frames, over the platform 90, without interfering with any cradles, either loaded or unloaded.

Figure 1:
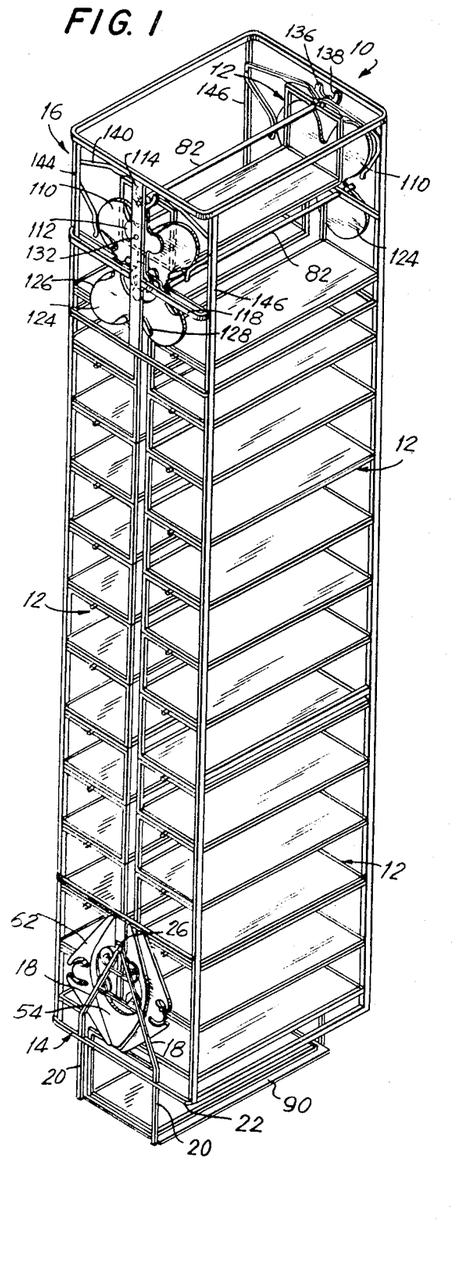
FIG. 1 is a perspective view of an embodiment of this invention illustrating a system adapted for the receipt, storage and discharge of automobiles.
Figure 2:
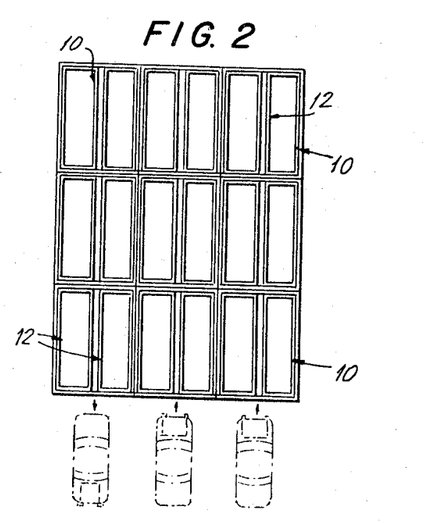
FIG. 2 is a top view in plan of an arrangement of nine systems, each system being of the type shown in FIG. 1.
Figure 3:
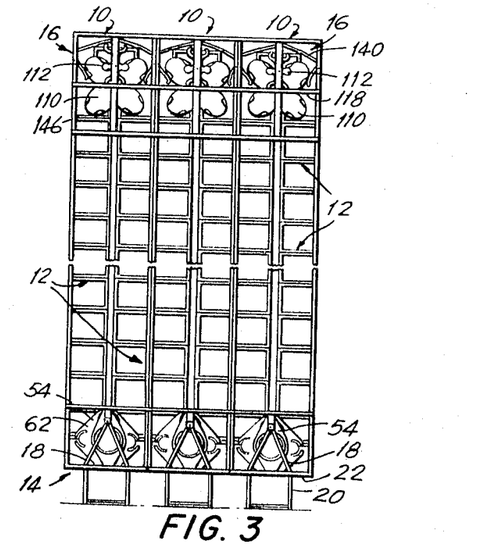
FIG. 3 is a front view in elevation of the arrangement of FIG. 2.

Advantageously then, a plurality of systems may be arranged one behind the other, as shown in FIG. 2. Here nine systems are arranged in a three by three array. An automobile may be driven through and under any system, even though each of the cradles of such a system is loaded with an automobile, to reach the loading platform of a system therebehind. Obviously, any such driven under system would have to be in the storage array shown in FIG. 8. There is no necessity to keep one cradle empty at all times in any front system so that an automobile may be driven thereunder.

When a cradle is in the receive-discharge position it is supported only by its pair of rollers 84 engaging the cam throats 102 of the lower lobes of the outer plates 54. However, as the cradle is swung toward one of the columns, the pair of rollers 86 leaves the mouths of the cams of the lower lobes of the inner plates 62 and enter into the throats 98. Now both pairs of plates are supporting the rollers of this cradle, with the rollers 84 and 86 rotating at different rates. The system is symmetrical, the operation is identical for both clockwise and counterclockwise operations.

The pivotally mounted loading platform 90 serves to receive a cradle as it is moved to the receive-discharge platform. Should such a cradle be tilted slightly as it approaches the lowermost position, it will engage the platform (rather than the ground) which will swing with and slide under it, guiding the cradle into a level approach to the lowermost receive-discharge position.

Figure 9:
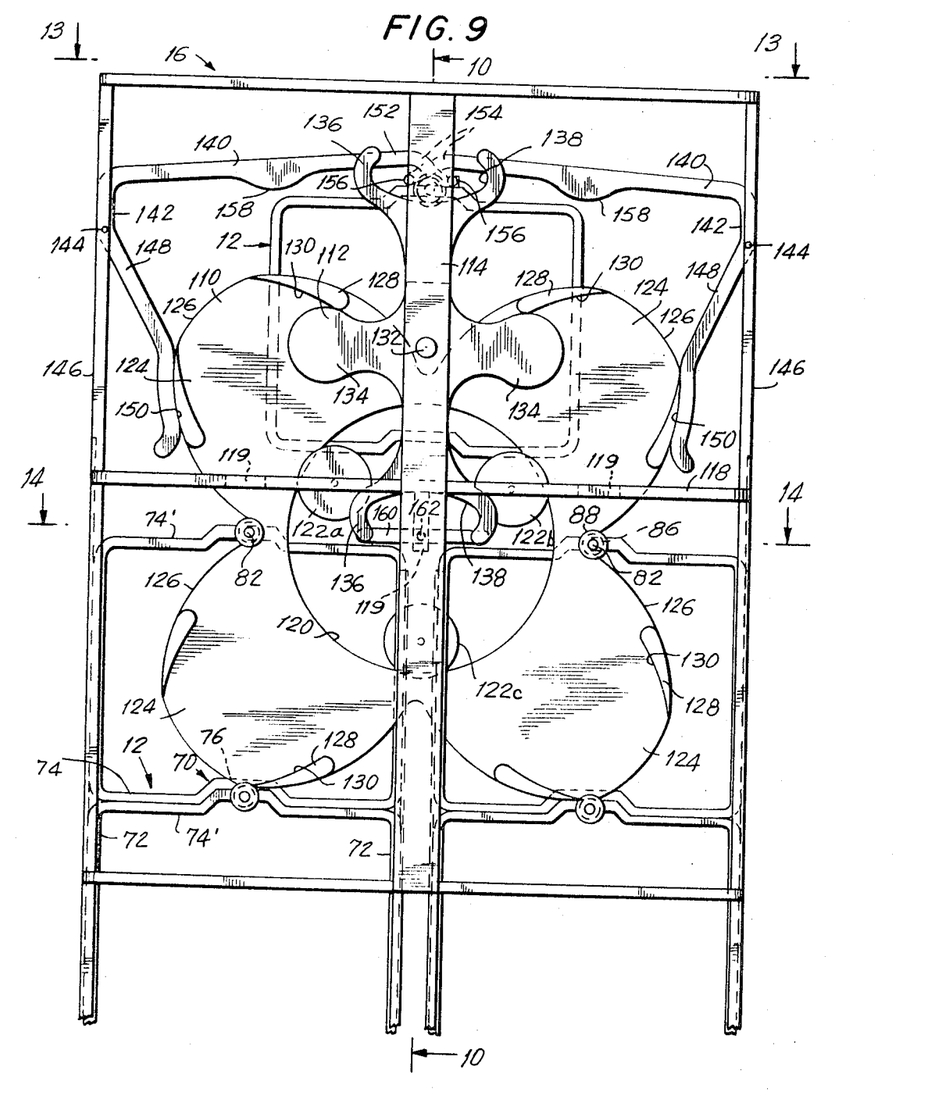
FIG. 9 is an enlarged detail front view of the upper portion of the system of FIG. 1, showing the upper means for translating the cradles, and showing an uppermost cradle in the central position, and corresponding to FIG. 4.
Figure 10:
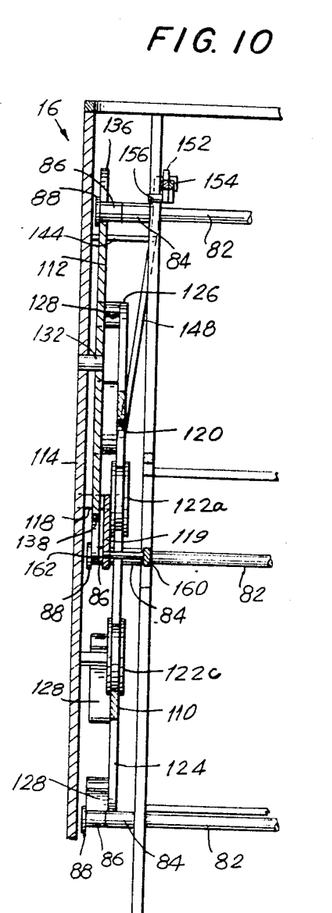
FIG. 10 is a side view in cross-section taken along the plane 10—10 of FIG. 9.

As seen in FIG. 9, the upper support means 16 is disposed at the top of the two columns of cradles. The upper support means comprises a pair of front and rear inner plates 110, a pair of front and rear outer plates 112, and a pair of front and rear support structures. The support structures may each comprise a vertical member 114, a horizontal member 118, an intermediate T-shaped member 119 having a horizontal part with bent over ends which are secured to this horizontal member 118 and having a downwardly extending part, and suitable intermediate framing which secures the members together to form a rigid structure. The inner plate 110 comprises a four lobe cam having a central circular aperture 120. Three double flanged rollers 122 are journaled to the vertical and horizontal members and the inner surface of the aperture 120 rides on and is guided by these rollers. The two upper rollers 122a and 122b are journaled on respective stub shafts to the horizontal part of the member 119. The lower roller 122c is journaled on a stub shaft to the vertical member 114. Each of the cam lobes 124 has a peripheral surface 126 constituting a cam surface and two projections 128 each having a cam surface 130. The cam surfaces 126 are engaged by the flanged rollers 86 of the cradles 12. As the columns of cradles are raised and lowered by the lower support means 14, their flanged rollers 86 drive the inner plate 110. As the left column of cradles rises and the right column lowers, the front inner plate shown in FIG. 9 is rotated clockwise.

The front and rear outer plates 112 are journaled on shafts 132 fixed to the vertical members 114. Each outer plate 112 comprises a four lobe cam. The lobes 134 engages the cam surfaces 130, and as the inner plates 110 are rotated by the column of cradles, the inner plates rotate the outer plate at an average of twice the rotational velocity by the cam surfaces 130 engaging the lobes 134 and 136. The lobes 136 each comprise a bifurcation having a concave cam surface 138.

Figure 11:
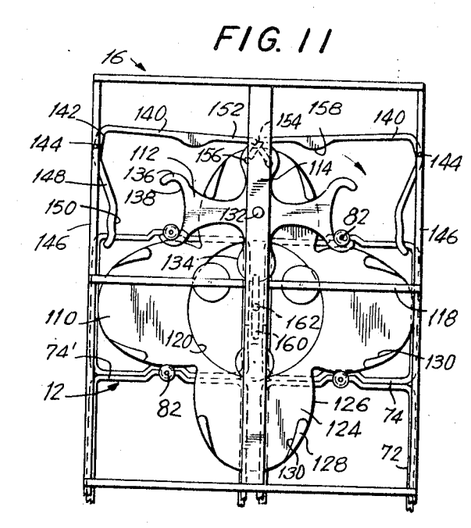
FIG. 11 is a detail similar to FIG. 9 showing the two columns of cradles as of equal height and number in the storage array.
Figure 12:
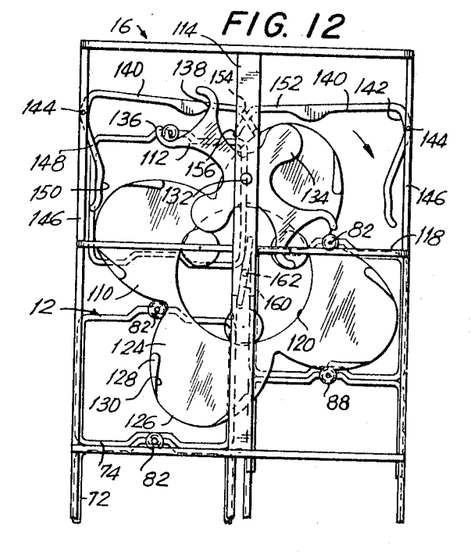
FIG. 12 is a detail similar to FIG. 11 showing one cradle partly translated from one column to the other.
Figure 13:
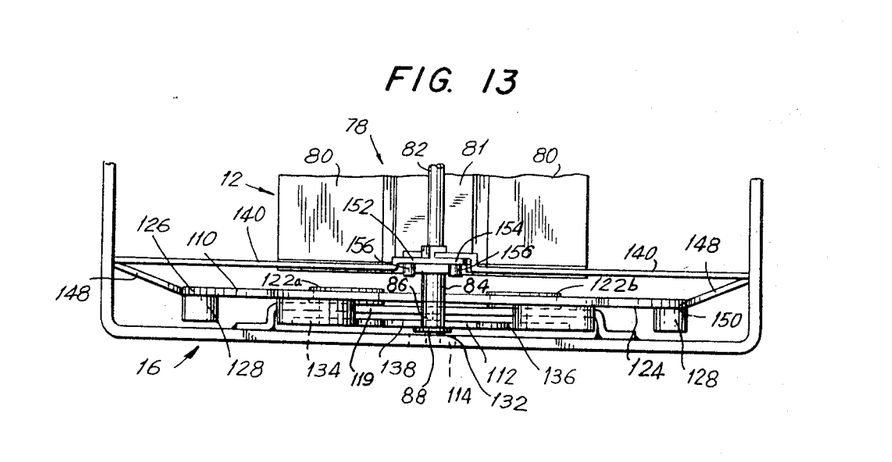
FIG. 13 is a top view in cross-section taken along the plane 13—13 of FIG. 9.
Figure 14:
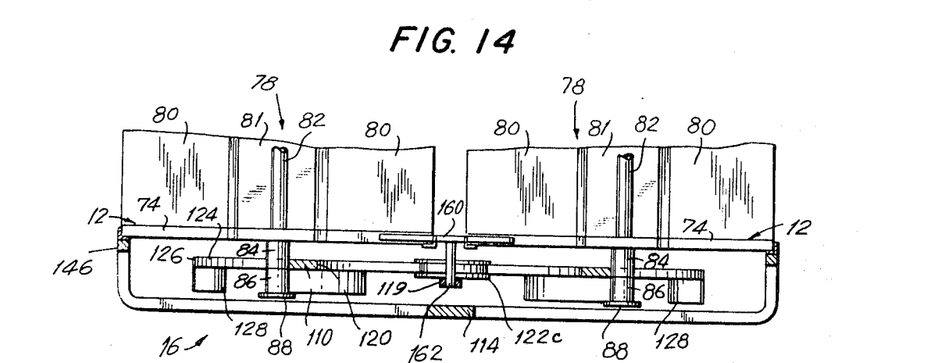
FIG. 14 is a top view in cross-section taken along the plane 14—14 of FIG. 9.

As seen in FIG. 11, the two columns of nested cradles are at equal levels, corresponding to the storage array of FIG. 8. In this array the rollers 86 of the upper cradles are engaged by the cam surfaces 138 of the outer plates 112. As the left column rises and the right column lowers, as seen in FIG. 12, the left upper cradle is slowly accelerated by the outer plates 112, is swung up and off its column and over to the central uppermost position shown in FIG. 9. Meanwhile, the rollers 86 of the right upper column leave the cam surfaces 138. The array of FIG. 9 corresponds to the receive-discharge array of FIG. 4. Further clockwise rotation of the inner plates 110 causes the outer plates to decelerate slowly, swinging the uppermost cradle to the top of the right column of nested cradles as shown in FIG. 11, while the other cam surfaces 138 engage the rollers 86 of the new upper cradle of the left column. If the system is halted with a cradle in the uppermost position of FIG. 9, so that the cradle in the lowermost position of FIG. 4 may receive or discharge an automobile, the rollers 86 of the cradle are free to ride up and down the concave cam surfaces 138 of the halted outer plates 112 to gradually expend the kinetic energy of the cradle, thereby precluding the upper structure of the system from having to absorb a substantial impact each time the system is so halted. Thus the framing of the system which is above the horizontal members 22 of the A frames need merely be made strong enough to act as guides for the columns of cradles and to give the system rigidity. The vertical load is supported by the nested cradles and there are no significant unbalanced lateral loads. These guides may be made to telescope to accommodate any wear in the cradles causing a shortening in the total height of the columns.

Although the possibility of tipping of the uppermost cradle, as it is swung between columns, is minimal, two stabilizer systems are provided to preclude any mishap. A front and a rear pair of stabilizer arms 140 are pivotally mounted to the framework. Each arm includes an elbow portion 142 which is pivotally mounted at 144 to a vertical frame member 146, a downwardly directed portion 148 having a distal cam surface 150 which engages the cam surface 126 of the inner plate 110, and a laterally extending arm 152. The arm 152 has a distal portion 154 with a transverse bend carrying a roller 156 which is adapted to bear on the upper surfaces of the ends of the cradles, and has an intermediate cam surface 158 which is also adapted to bear on the upper surfaces of the ends of the cradles. These arms follow the cam surfaces of the inner plates 110 to ensure the substantially upright attitude of the uppermost cradle as it is swung between the columns. However, the arms do not rigidly hold the uppermost cradle upright, but allow a certain amount of sway. This prevents sudden stresses and loads which might produce undesirable lateral forces on the cradle and its contents. Further, as best seen in FIGS. 9, 11 and 12, a pair of front and rear interposer plates 160 are each respectively mounted by stub shafts 162 to the vertical parts of the respective front and rear members 119. These plates are interposed between the two uppermost cradles when the system is in the storage array. When one of the cradles is shifted up and over to the other column, the interposer plates rotate with and under the shifted cradle, to preclude its engagement of the adjacent cradles.

It will be appreciated that the system may be readily constructed without the assistance of cranes or other equipment which must reach the top of the system. The lower support means 14 is first erected. Then the cradles are each in sequence transversely inserted between the A frames, the rollers 84 and 86 installed on the shaft 82 with the rollers 86 engaged with the outer plates 54, and the cradle shifted to the bottom of one column. The last cradle in the sequence may be loaded with the material forming the upper support means and the cradles in the lower half of the one column are shifted to the other column, the loaded last cradle now being the upper cradle in the other column. The material forming the upper support means is now disposed at the top of the system and may be assembled. A certain amount of guying may have to be provided during these operations to ensure the lateral stability of the columns.

After the initial installation of the system, an even number of cradles may be added to or removed from the system without altering the lower and upper shifting means, so long as, in the case of addition, the lower shifting means and the cradles are strong enough to support the additional weight. However, as each added or removed cradle is shifted to or from the bottom of one column the bottom of the lowest cradle in the other column above the lower shifting means will have to be supported by jacks.

It will also be appreciated that this system may be used for elevating and/or storing materials other than automobiles, as in a warehouse. In such usage the cradles between the upper and lower support means, together with the cradle in the lowermost receive-discharge position are accessible from all four sides when such cradle is level with a warehouse floor.

It will further be appreciated that this invention may be embodied as a top loading system, for use, for example, in the hold of a ship. Here rapid loading and discharging are essential together with maximum utilization of the available storage volume. Thus, such a system would extend vertically through the full hold of the ship. The vertical members 20 of the A frame would be formed as hydraulically operated jacks. For loading and discharging the jacks would be extended, raising the system so that the uppermost cradle is above the deck of the ship and the cargo may be driven directly onto its material supporting surface. For storage, the system is disposed in the storage array of FIGS. 8 and 11 and the jacks are retracted, lowering the system below the deck and completely filling the hold with cargo.

In brief recapitulation, it will be appreciated that this invention provides the following advantages, among others:

The cradles are stacked on top of each other and carry each other's weight in such a way that only the cradles located at the bottom carry the load of all the higher cradles including the top switch mechanism. Consequently these cradles are not hanging onto steel wires or chains which are supported at the top as with other systems, involving that the outer steel frame structure in my system carrys no load other than its own weight. This outer steel frame structure above the bottom drive wheel mechanism acts only as a guide and to give the structure sufficient rigidity. Therefore, it can be of very light construction.

No heavy parts are located at the top since the drive mechanism is completely located at the bottom side. In this way no heavy lifting gear is necessary when such a storage system is being erected. During erection when the bottom frame for the drive wheels and the drive mechanism is installed, the rest can be erected by installing the cradles at the bottom and have these serve as elevators to bring the structural parts for the outer frame up and the top switch mechanism. When two subsequent cages at the bottom are located at the same level in elevated position from the ground, the bottom of these cradles are at the same height from the ground as the height of a cradle. Consequently this allows full cage height-passage underneath in this position for cargo and auto passage.

The system involves less friction and consequently less loss of energy than other systems with chains with rollers at the pivoting points where the cradles by means of links are supported by the chains.

Because of absense of chains or wires no special arrangements are needed to take up the slack in case these chains or wires would stretch, or to adjust the height of the lowest cradles in case of such stretch.

In case units are erected for instance in warehouse buildings, the cradles in between the bottom drive wheel and top switch wheel are accessible from all four sides for loading and discharging when in a level position with a floor. This also applies to the lowest cradles when it is at floor level.

The space between the cradles in the vertical plane is built to a minimum just allowing to pass each other.

When the cradles are moving from one side to the other at the top and bottom, and when their linear movement is changed into a curved path, the stabilizing arrangement to prevent them from swinging is not rigidly holding the cradles with their vertical position but allowing a certain amount of sway. This to prevent sudden stresses and loads thus providing undue sideways forces on the cradles and their contents. At the top when the movement stops with a cradle in top position, this cage is allowed to continue its sideways movement in the fork by which it is supported and the supporting rollers of that cradle is allowing it to move back and forth in this fork for dampening the tendency to sway at a sudden halt coming. At the bottom a cradle is kept with its bottom and horizontal position by the "swing" device. This device causes that a cradle which is approaching bottom position under a slight angle is gradually being brought to its horizontal position. Since the drive mechanism is located at the bottom point of the installation servicing and maintenance next to supervision is easier than when located at the top of the mechanism.

In spaces where quick loading and discharging is essential next to an optimum use of the available space when the goods are in stored condition such as on ships, the legs or the supporting members of the load carrying parts of the installation could be arranged in such a way that when the two lowest supporting cradles are in elevated position, the whole installation is lowered for instance by hydraulic jacks until a point where the bottom of these cradles reach the floor. The installation can then be kept in this lowered position during periods when it is only used for storage and when not loading or discharging.

Additional cradles can be added or cradles can be taken out of the installation without altering any of the moving parts in the mechanism as long as the load drive mechanism and structure is built to absorb additional weight in case more load and cradles are added.

While I have shown and described a preferred embodiment of the invention, it will be understood that the invention may be embodied otherwise than as herein specifically illustrated or described, and that certain changes in the form and arrangement of the parts and in the specific manner of practicing the invention may be made without departing from the underlying idea or principles of the invention within the scope of the appended claims.

What is claimed is:

1. A material support system, comprising: a plurality of movable support units, each having a material support surface, arranged in two vertical columns of units; a lower support means for supporting said two columns of said support units and for sequentially translating said support units from one of said columns to the other of said columns; and an upper support means which is supported by said two vertical columns of said movable support units for sequentially translating support units from said other of said columns to said one of said columns.

2. A system according to claim 1, wherein said lower support means includes first means for releasably supporting the lowest movable support unit in each column, and for shifting said one column downwardly and said other column upwardly; and second means for releasably supporting said lowest movable support unit in said one column and for shifting said lowest movable support unit from the bottom of said one column to the bottom of said other column; whereby said first means releases said lowest movable support unit in said one column as said second means shifts it towards said other column and supports the next lowest movable support unit in said one column, and said first means supports said shifted movable support unit as said second means shifts it towards the bottom of said other column.

3. A system according to claim 2, wherein at least the intermediate movable support units in each column are nested and said upper support means includes third means for being releasably supported by the highest nested movable support unit in each column; and fourth means for releasably supporting the highest movable support unit in said other column and for shifting said highest movable support unit from the top of said other column to the top of said one column; whereby said third means is released by said highest movable support unit in said other column as said fourth means shifts it towards said one column and is supported by the next highest nested movable support unit in said other column.

4. A system according to claim 2 wherein said upper support means is operated by the relative up and down movement of said two columns provided by said lower support means.

5. A system according to claim 3 wherein said third means is operated by the relative up and down movement of said two columns provided by said lower support means, and said fourth means is operated by the operation of said third means.

6. A system according to claim 2 wherein said first means shifts said columns upwardly and downwardly at a first rate of speed; and said second means shifts said lowermost movable support unit from said one column at a rate gradually accelerating from said first rate, and shifts said shifted movable support unit to said other column at a rate gradually decelerating to said first rate.

7. A system according to claim 3 wherein said first means shifts said columns upwardly and downwardly at a first rate of speed; and said fourth means shifts said uppermost movable support unit from said other column at a rate gradually accelerating from said first rate, and shifts said shifted movable support unit to said one column at a rate gradually decelerating to said first rate.

8. A system according to claim 1 wherein said lower and said upper support means are adapted to dispose all of said movable support units in an array of two vertical columns, with the bottoms of said lowest unit in each column being above the ground level by a distance substantially equal to the height of a movable support unit, whereby material may be readily passed under said movable support units, and to dispose said movable support units into a different array with the bottom of one of said movable support units substantially at the ground level, whereby material may be readily loaded onto said movable support unit.

9. A system according to claim 1 wherein said lower and said upper support means are adapted to dispose all of said movable support units in a first array of said two vertical columns, with the bottoms of said lowest units being above the ground level by a distance substantially equal to the height of a movable support unit, and to dispose said units into a second array of two vertical columns with one of said units disposed between said columns with the bottom of said unit being substantially at ground level.

10. A system according to claim 9 wherein in said second array of units a second one of said units is disposed between and above said columns.

11. A system according to claim 9 further including a shiftable element disposed above the ground level and adapted to be engaged by, to shift with and to slide with respect to said one of said units as it is translated into and from its second array position between said columns.

12. A system according to claim 2 wherein said movable support units are each a cradle comprising a material support surface supported by and from a vertically overhead, laterally central and transversely extended bearing means.

13. A system according to claim 12 wherein said first means comprises a pair of coaxial, transversely spaced apart, four lobed cams, having cam surfaces upon which said cradle bearing means ride, the bearing means of at least two of said cradles, one in each of said columns, being always supported on said cam surfaces.

14. A system according to claim 13 wherein said second means comprises a pair of coaxial, transversely spaced apart, two lobed cams, coaxial with and adapted to be driven at twice the rate of said four lobed cams, having cam surfaces upon which said cradle bearing means ride, the bearing means of at least one of said cradles being always supported on said cam surfaces.

15. A system according to claim 3 wherein said movable support units are each a cradle comprising a material support surface supported by and from a vertically overhead, laterally central and transversely extended bearing means; and said third means comprises a pair of coaxial, transversely spaced apart, four lobed cams, having cam surfaces upon which said cradle bearing means ride, the bearing means of at least two of said nested cradles, one in each of said columns always supporting said cam surfaces.

16. A system according to claim 15 wherein said third means further includes additional cam surfaces on each lobe; and said fourth means comprises a pair of coaxial, transversely spaced apart, four lobe cams, two opposite ones of said lobes of each of said cams having cam surfaces upon which said cradle bearing means ride, the bearing means of at least one of said cradle being always supported on said cam surfaces, the other two opposite ones of said lobes of each of said cams having cam surfaces in engagement with and driven by said additional cam surfaces of said cams of said third means.

17. A system according to claim 16 wherein said cams of said fourth means are eccentric to said cams of said third means.

18. A system according to claim 16 wherein each of said first mentioned two opposite ones of said lobes of each of said cams of said fourth means is bifurcated, providing a concave cam surface, whereby when said cams are halted in rotation with said bifurcated lobes vertical and a cradle supported therefrom by its transversely extended bearing means, said bearing means are free to leave the lowermost portion of said concave cam surfaces and to ride up and back on said surfaces thereby gradually decelerating and halting said cradle.

19. A system according to claim 16 including a plurality of arms each having a follower portion and a cradle engaging portion, said follower portion adapted to be displaced by said cam surfaces of said fourth means to displace said cradle engaging portion towards a cradle which is being shifted from one column to the other column whereby said engaging portion engages said cradle in the event said cradle substantially swings from the vertical on its bearing means.

20. A system according to claim 1 wherein said lower support means includes a rotating output motive means engaging the lower ends of said columns and adapted to selectively alternatively push one or the other of said columns upwardly continuously and to continuously, sequentially translate movable support units to the bottom of that column which is being pushed upwardly.

References Cited

UNITED STATES PATENTS

| | | |
|---|---|---|
| 1,805,029 | 5/1931 | Baker. |
| 1,980,850 | 11/1934 | Clark. |
| 2,955,718 | 10/1960 | Messick. |
| 2,996,199 | 8/1961 | Popper. |
| 3,084,786 | 4/1963 | Wullschleger. |
| 3,085,700 | 4/1963 | O'Sullivan. |

EDWARD A. SROKA, *Primary Examiner.*

U.S. Cl. X.R.

214—16.1